(12) United States Patent
Elder et al.

(10) Patent No.: US 7,249,123 B2
(45) Date of Patent: Jul. 24, 2007

(54) SYSTEM AND METHOD FOR BUILDING SOCIAL NETWORKS BASED ON ACTIVITY AROUND SHARED VIRTUAL OBJECTS

(75) Inventors: Michael D. Elder, Greer, SC (US); Jason Y. Jho, Raleigh, NC (US); Vaughn T. Rokosz, Newton, MA (US); Andrew L. Schirmer, Andover, MA (US); Matthew Schultz, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 10/285,799

(22) Filed: Oct. 31, 2002

(65) Prior Publication Data

US 2004/0088325 A1 May 6, 2004

(51) Int. Cl.
*G06F 17/30* (2006.01)
(52) U.S. Cl. .................. 707/3; 707/2; 707/4; 707/1
(58) Field of Classification Search .............. 707/1–10, 707/100–104.1, 200–206; 715/501.1, 501; 709/202–206, 229; 706/12, 1, 12.1; 382/209; 703/6; 705/26, 8; 345/733, 349; 364/419.01, 364/401, 419; 704/9; 395/349, 733
See application file for complete search history.

(56) References Cited

U.S. PATENT DOCUMENTS

| | | | |
|---|---|---|---|
| 4,908,761 A | 3/1990 | Tai ............................. | 364/401 |
| 5,371,673 A | 12/1994 | Fan ........................ | 364/419.01 |
| 5,745,113 A | 4/1998 | Jordan et al. ................ | 345/349 |
| 5,933,818 A | 8/1999 | Kasravi et al. ................ | 706/12 |
| 6,006,223 A | 12/1999 | Agrawal et al. ................ | 707/5 |
| 6,018,734 A | 1/2000 | Zhang et al. ................... | 707/3 |
| 6,070,143 A | 5/2000 | Barney et al. ................. | 705/8 |
| 6,115,718 A | 9/2000 | Huberman et al. .......... | 707/102 |
| 6,138,128 A | 10/2000 | Perkowitz et al. ........ | 715/501.1 |
| 6,148,294 A | 11/2000 | Beyda et al. .................. | 707/1 |

(Continued)

FOREIGN PATENT DOCUMENTS

JP         2001119403 A       4/2001

(Continued)

OTHER PUBLICATIONS

Brouillette, S. M. and J. P. Lavelle. *A Methodology for Mapping and Analyzing Community Social Services as a System*. Norcross, 6th Industrial Engineering Research Conference Proceedings. Miami Beach, May 17-18, 1997. Institute of Industrial Engineers, Norcross, GA, 1997. 662-667.

(Continued)

*Primary Examiner*—Yicun Wu

(57) ABSTRACT

A system and method for determining a social network. A metrics database stores virtual object indicia including document attributes, activities, and associated persons. A query engine responsive to a user request and the metrics database infers individual connections to the virtual object by individuals executing the activities. A visualization engine visualizes membership in the social network as including these individuals and the activities connecting them. The query engine further collects a plurality of documents having non-unique values on a first shared attribute into an aggregate, and the visualization engine further filters the social network to include only individuals having membership in the aggregate.

12 Claims, 8 Drawing Sheets

U.S. PATENT DOCUMENTS

| | | |
|---|---|---|
| 6,177,932 B1 | 1/2001 | Galdes et al. ............... 345/733 |
| 6,182,067 B1 | 1/2001 | Presnell et al. ................ 707/5 |
| 6,195,657 B1 | 2/2001 | Rucker et al. ................. 707/5 |
| 6,199,067 B1 | 3/2001 | Geller ......................... 707/10 |
| 6,212,494 B1 | 4/2001 | Boguraev ..................... 704/9 |
| 6,216,098 B1* | 4/2001 | Clancey et al. ............... 703/6 |
| 6,233,583 B1 | 5/2001 | Hoth .......................... 707/102 |
| 6,249,779 B1 | 6/2001 | Hitt ............................... 706/1 |
| 6,266,649 B1 | 7/2001 | Linden et al. ................ 705/26 |
| 6,275,820 B1 | 8/2001 | Navin-Chandra et al. ...... 707/3 |
| 6,334,127 B1 | 12/2001 | Bieganski et al. ............. 707/5 |
| 6,363,174 B1 | 3/2002 | Lu ............................. 382/209 |
| 6,594,673 B1* | 7/2003 | Smith et al. .............. 707/104.1 |
| 6,742,032 B1* | 5/2004 | Castellani et al. .......... 709/224 |
| 2002/0035593 A1 | 3/2002 | Salim et al. ................ 709/202 |
| 2002/0116466 A1* | 8/2002 | Trevithick et al. .......... 709/206 |
| 2003/0050977 A1* | 3/2003 | Puthenkulam et al. ...... 709/204 |

FOREIGN PATENT DOCUMENTS

| | | |
|---|---|---|
| WO | WO 0137162 A2 | 5/2001 |
| WO | WO0201455 A2 | 2/2002 |

OTHER PUBLICATIONS

Sack, W. *Diagrams of Social Cohesion*. Association for Computational Linguistics, U of Maryland. MIT Media Laboratory, Jun. 1999. 3 plus 8 pages.

Kautz, H., B. Selman, M. Shah.. *Referral Web: Combining Social Networks and Collaborative Filtering*. Communications of the ACM, vol. 40, No. 3, Mar. 1997.

Schwartz, M. F., D. C. M. Wood. *Discovering shared interests using graph analysis*. Communications of the ACM, v. 36 n. 8 Aug. 1993. 78-89.

Wellman, B. *For a social network analysis of computer networks: a socialogical perspective on collaborative work and virtual community*. Proceedings of the 1996 conference on ACM SIGCPR/SIGMIS. 1-11.

Qureshi, S. *Supporting electronic groupprocesses: a social perspective*. Proceedings of the 1995 ACM SIGCPR Conference on Supporting teams, groups, and learning inside the IS function. ACM Press. 24-34.

Ackerman, M.S., B. Starr. *Social activity indicators: interface components for CSCW systems*. Proceedings of the 8th ACM Symposium on User Interface and Software Technology. ACM Press. 159-168, Nov. 14-17, 1995.

Garton, L., C. Haythornthwaite, B. Wellman. *Studying on-line social networks* in Doing Internet Research, edited by Steve Jones, Thousand Oaks, CA: Sage, 1999.

Srivastava, Jaidepp, Robert Cooley, Mukund Deshpande, Pang-Ning Tan. *Web Usage Mining: Discovery and Applications of Usage Patterns from Web Data*. SIGKDD Explorations, vol. 1, Issue 2. Jan. 2000. 12-23.

Wang, Y. *Web Mining and Knowledge Discovery of Usage Patterns*. CS748T Project (Part I) Feb. 2000.

Sack, W. *Conversation Map: a content-based Usenet newsgroup browser*. Proceedings of the 2000 International Conference on Intelligent User Interfaces. ACM Press. 233-240.

Kaugers, K. *Integrated multi scale text retrieval visualization*. Conference on Human Factors and Computing Systems, Proceeedings o fthe Conference on CHI 98 Summary: Human Factors in Computing Systems, ISBN: 1-58113-028-7 ACM Digital Library, 1998. 307-308.

Feldman, R. *Mining unstructured data*. Tutorial notes for ACK SIGKDD 1999. ACM Press. 182-236.

U.S. Appl. No. 10/286,211, filed Oct. 31, 2002, for "System and Method for Determining Founders of an Information Aggregate".

\* cited by examiner

XML FORMAT FOR SQL QUERIES

QRML STRUCTURE

SYSTEM AND METHOD FOR BUILDING SOCIAL NETWORKS BASED ON ACTIVITY AROUND SHARED VIRTUAL OBJECTS

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 10/286,211 filed 31 Oct. 2002 for "SYSTEM AND METHOD FOR DETERMINING FOUNDERS OF AN INFORMATION AGGREGATE";

Ser. No. 10/286,263, filed 31 Oct. 2002 for "SYSTEM AND METHOD FOR FINDING THE ACCELERATION OF AN INFORMATION AGGREGATE";

Ser. No. 10/286,262, filed 31 Oct. 2002 for "SYSTEM AND METHOD FOR FINDING THE RECENCY OF AN INFORMATION AGGREGATE";

Ser. No. 10/286,261, filed 31 Oct. 2002 for "SYSTEM AND METHOD FOR EXAMINING THE AGING OF AN INFORMATION AGGREGATE";

Ser. No. 10/286,212, filed 31 Oct. 2002 for "SYSTEM AND METHOD FOR DETERMINING CONNECTIONS BETWEEN INFORMATION AGGREGATES";

Ser. No. 10/286,237, filed 31 Oct. 2002 for "SYSTEM AND METHOD FOR DETERMINING MEMBERSHIP OF INFORMATION AGGREGATES";

Ser. No. 10/286,508, filed 31 Oct. 2002 for "SYSTEM AND METHOD FOR EVALUATING INFORMATION AGGREGATES BY VISUALIZING ASSOCIATED CATEGORIES";

Ser. No. 10/286,145, filed 31 Oct. 2002 for "SYSTEM AND METHOD FOR DETERMINING COMMUNITY OVERLAP"; and Ser. No. 10/286,534, filed 31 Oct. 2002 for "SYSTEM AND METHOD FOR ANALYZING USAGE PATTERNS IN INFORMATION AGGREGATES".

BACKGROUND OF THE INVENTION

1. Technical Field of the Invention

This invention relates to an improved system and method for building a social network. More particularly, it relates to social networks built around activity on shared virtual objects and an expanded set of activity metrics.

2. Background Art

Social network analysis is a way of looking at how people interact. If one is able to understand the interaction patterns between people, it becomes possible to more quickly find people who might be able to answer questions, understand the impact of organizational change initiatives, and find people who serve as "bridges" between different parts of an organization.

One of the main drawbacks to social network analysis is that it is difficult to carry out. One research technique is to use in-person interviews, which can be very time consuming. Given the dynamic nature of a social network, this technique is far too slow to be of use.

The Lotus Discovery Server (LDS) is a Knowledge Management (KM) tool that allows users to more rapidly locate the people and information they need to answer their questions. It categorizes information from many different sources (referred to generally as knowledge repositories) and provides a coherent entry point for a user seeking information. Moreover, as users interact with LDS and the knowledge repositories that it manages, LDS can learn what the users of the system consider important by observing how users interact with knowledge resources. Thus, it becomes easier for users to quickly locate relevant information.

The focus of LDS is to provide specific knowledge or answers to localized inquiries; focusing users on the documents, categories, and people who can answer their questions. There is a need to go beyond these basic search capabilities in order to uncover the relationships between people that are implied by the way people work with documents.

Mechanisms have been proposed to infer social networks from electronic communication. Such mechanisms include the use of a graphical display to show a large set of interconnected people, use of synchronous chat as a source of connection data, use of electronic meetings as a source of connection data, use of citations and hyperlinks in Web pages, analysis of E-mail messages, use of the co-occurence of names in close proximity in Web documents, use of links found in home pages, use of co-authors of technical papers, use of exchanges between individuals in news groups, and use of organizational charts. In order to build a complete social network, however, there is a need in the art for a system and method which provide for a broader set of activity metrics, for the use of virtual objects, and for display filtering.

It is an object of the invention to provide an improved system and method for building a social network.

SUMMARY OF THE INVENTION

A system and method for building a social network, by selecting a virtual object; tracking activity by a plurality of individuals on the virtual object; inferring individual connections to the virtual object by the individuals; and defining the social network to include individuals sharing connections to said virtual object.

In accordance with an aspect of the invention, there is provided a computer program product configured to be operable to for building and visualizing a social network based on connections to a shared virtual object.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

Figure 1:
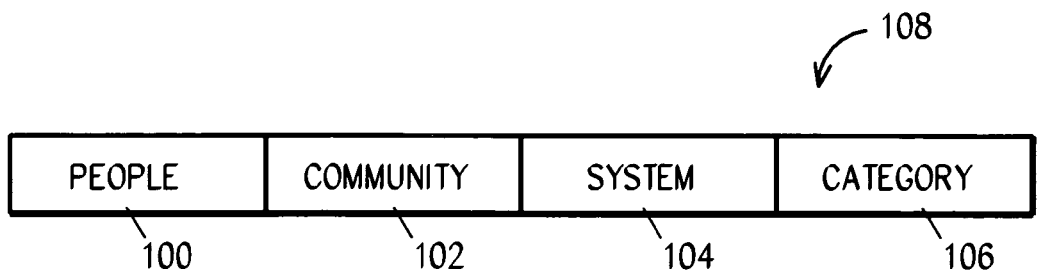
FIG. 1 is a diagrammatic representation of visualization portfolio strategically partitioned into four distinct domains in accordance with the preferred embodiment of the invention.

In accordance with the preferred embodiment of the invention, a system and method is provided for building a social network based upon a broad set of activity metrics and various types of virtual objects. Thus, a social network may be built based on activity around a shared virtual object and/or meta-data in a virtual object. Such metrics and objects include document edits, shared affinities, access control lists, expertise profiles, and display filtering using information aggregates.

In an exemplary embodiment of the present invention, the functionality of the Lotus Discovery Server (LDS) is extended to build a social network by determining, extracting, and visualizing knowledge metric data.

LDS manages knowledge resources. A knowledge resources is any form of document that contains knowledge or information. Examples include Lotus WordPro Documents, Microsoft Word Documents, webpages, postings to newsgroups, etc. Knowledge resources are typically stored within knowledge repositories—such as Domino.Doc databases, websites, newsgroups, etc.

When LDS is first installed, an Automated Taxonomy Generator (ATG) subcomponent builds a hierarchy of the knowledge resources stored in the knowledge repositories specified by the user. For instance, a document about working with XML documents in the Java programming language stored in a Domino.Doc database might be grouped into a category named 'Home>Development>Java>XML'. This categorization will not move or modify the document, just record its location in the hierarchy. The hierarchy can be manually adjusted and tweaked as needed once initially created.

A category is a collection of knowledge resources and other subcategories of similar content. Categories represent a more abstract re-organization of the contents of physical repositories, without displacing the available knowledge resources. For instance, in the following hierarchy:

Home (Root of the hierarchy)
  Animals
    Dogs
    Cats
  Industry News and Analysis
    CNN
    ABC News
    MSNBC 'Home>Animals', 'Home>Industry News and Analysis', and 'Home>Industry News and Analysis>CNN' are each categories that can contain knowledge resources and other subcategories. Furthermore, 'Home>Industry News and Analysis>CNN' might contain documents from www.cnn.com and documents created by users about CNN articles which are themselves stored in a Domino.Doc database.

Knowledge repositories are then grouped into sets, known as communities. A community is a set of repositories primarily utilized by some particular group of people. Communities are only defined by administrative users of the system (unlike categories which can be created by LDS and then modified). If a user interacts with one of the repositories used to define Community A, then he is considered an active participant in that community. Thus, communities represent the physical storage of knowledge resources and provide a mechanism for LDS to observe the activity of a group of people.

Communities are particularly useful in identifying social networks.

As a user interacts with knowledge resources, LDS learns which categories they interact with the most. LDS maintains a score for the user, known as an affinity. An affinity is a rank that numerically captures how often a user interacts with a particular category compared to the level of interaction of other users. Affinities within the system are only important in relation to the other affinities. Once a user's affinity reaches a certain threshold, LDS asks the user if he would like to publish that affinity. These affinities can then be made public, so that when other users search on a topic, LDS can identify users who are knowledgeable on that topic. These affinities are extremely useful in making inferences about the interests of the users of the system.

LDS maintains a score for the knowledge resources which are utilized to indicate how important they are to the users of the system. For instance, a document that has a lot of activity around it—such as responses, modifications or simply a high access rate—is perceived as more important than documents which are rarely accessed. This is generically referred to as 'document value'.

The system and method of the preferred embodiments of the invention are built on a framework that collectively integrates data-mining, user-interface, visualization, and server-side technologies. An extensible architecture provides a layered process of transforming data sources into a state that can be interpreted and outputted by visualization components. This architecture is implemented through Java, Servlets, JSP, SQL, XML, and XSLT technology, and essentially adheres to a model-view controller paradigm, where interface and implementation components are separated. This allows effective data management and server side matters such as connection pooling to be independent.

In accordance with the preferred embodiment of the invention, information visualization techniques are implemented through the three main elements including bar charts, pie charts, and tables. Given the simplicity of the visualization types themselves, the context in which they are contained is what makes them powerful mediums to reveal and magnify hidden knowledge dynamics within an organization.

Referring to FIG. 1, a visualization portfolio is strategically partitioned into four distinct domains, or explorers: people 100, community 102, system 104, and category 106. The purpose of these partitioned explorers 100-106 is to provide meaningful context for the visualizations. The raw usage pattern metrics produced from the Lotus Discovery Server (LDS) do not raise any significant value unless there is an applied context to it. In order to shed light on the hidden relationships behind the process of knowledge creation and maintenance, there is a need to ask many important questions. Who are the knowledge creators? Who are the ones receiving knowledge? What group of people are targeted as field experts? How are groups communicating with each other? Which categories of information are thriving or lacking activity? How is knowledge transforming through time? While answering many of these questions, four key targeted domains, or explorer types 100-106 are identified, and form the navigational strategy for user interface 108. This way, users can infer meaningful knowledge trends and dynamics that are context specific.

People Domain 100

People explorer 100 focuses on social networking, community connection analysis, category leaders, and affinity analysis. The primary visualization component is table listings and associations. Social networking in the people explorer is the focus of the present invention.

Community Domain 102

Community explorer 102 focuses on acceleration, associations, affinity analysis, and document analysis for Lotus K-Station communities. The primary visualization components-are bar charts and table listings. Features include drill down options to view associated categories, top documents, and top contributors.

System Domain 104

System explorer 104 focuses on high level activity views such as authors, searches, accesses, opens, and responses for documents. The primary visualization components are bar charts (grouped and stacked). Features include zooming and scrollable regions.

Category Domain 106

Category explorer 106 focuses on lifespan, acceleration, affinity analysis, and document analysis of categories generated by a Lotus Discovery Server's Automated Taxonomy Generator. The primary visualization components are bar charts. Features include drill down options to view subcategories, top documents, top contributors, category founders, and document activity.

System Overview

Figure 2:
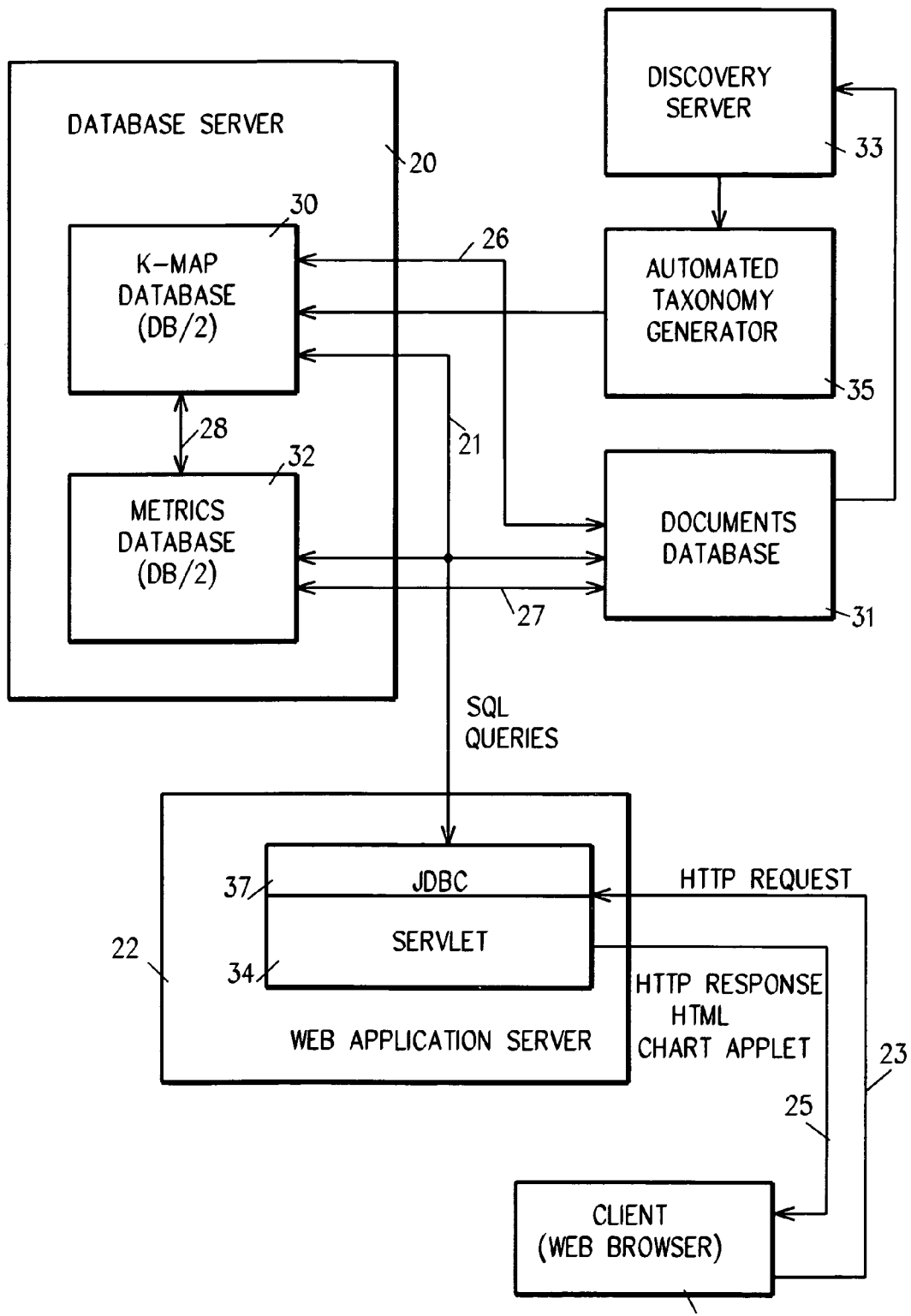
FIG. 2 is a system diagram illustrating a client/server system in accordance with the preferred embodiment of the invention.

Referring to FIG. 2, an exemplary client/server system is illustrated, including database server 20, discovery server 33, automated taxonomy generator 35, web application server 22, and client browser 24.

Knowledge management is defined as a discipline to systematically leverage information and expertise to improve organizational responsiveness, innovation, competency, and efficiency. Discovery server 33 (e.g. Lotus Discovery Server) is a knowledge system which may deployed across one or more servers. Discovery server 33 integrates code from several sources (e.g., Domino, DB2, InXight, KeyView and Sametime) to collect, analyze and identify relationships between documents, people, and topics across an organization. Discovery server 33 may store this information in a data store 31 and may present the information for browse/query through a web interface referred to as a knowledge map (e.g., K-map) 30. Discovery server 33 regularly updates knowledge map 30 by tracking data content, user expertise, and user activity which it gathers from various sources (e.g. Lotus Notes databases, web sites, file systems, etc.) using spiders.

Database server 20 includes knowledge map database 30 for storing a hierarchy or directory structure which is generated by automated taxonomy generator 35, and metrics database 32 for storing a collection of attributes of documents stored in documents database 31 which are useful for forming visualizations of information aggregates. The k-map database 30, the documents database 31, and the metrics database are directly linked by a key structure represented by lines 26, 27 and 28. A taxonomy is a generic term used to describe a classification scheme, or a way to organize and present information, Knowledge map 30 is a taxonomy, which is a hierarchical representation of content organized by a suitable builder process (e.g., generator 35).

A spider is a process used by discovery server 33 to extract information from data repositories. A data repository (e.g. database 31) is defined as any source of information that can be spidered by a discovery server 33.

Java Database Connectivity API (JDBC) 37 is used by servlet 34 to issue Structured Query Language (SQL) queries against databases 30, 31, 32 to extract data that is relevant to a users request 23 as specified in a request parameter which is used to filter data. Documents database 31 is a storage of documents in, for example, a Domino database or DB2 relational database.

The automated taxonomy generator (ATG) 35 is a program that implements an expectation maximization algorithm to construct a hierarchy of documents in knowledge map (K-map) metrics database 32, and receives SQL queries on link 21 from web application server 22, which includes servlet 34. Servlet 34 receives HTTP requests on line 23 from client 24, queries database server 20 on line 21, and provides HTTP responses, HTML and chart applets back to client 24 on line 25.

Discovery server 33, database server 20 and related components are further described in U.S. patent application Ser. No. 10,044,914 filed 15 Jan. 2002 for System and Method for Implementing a Metrics Engine for Tracking Relationships Over Time.

Figure 3:
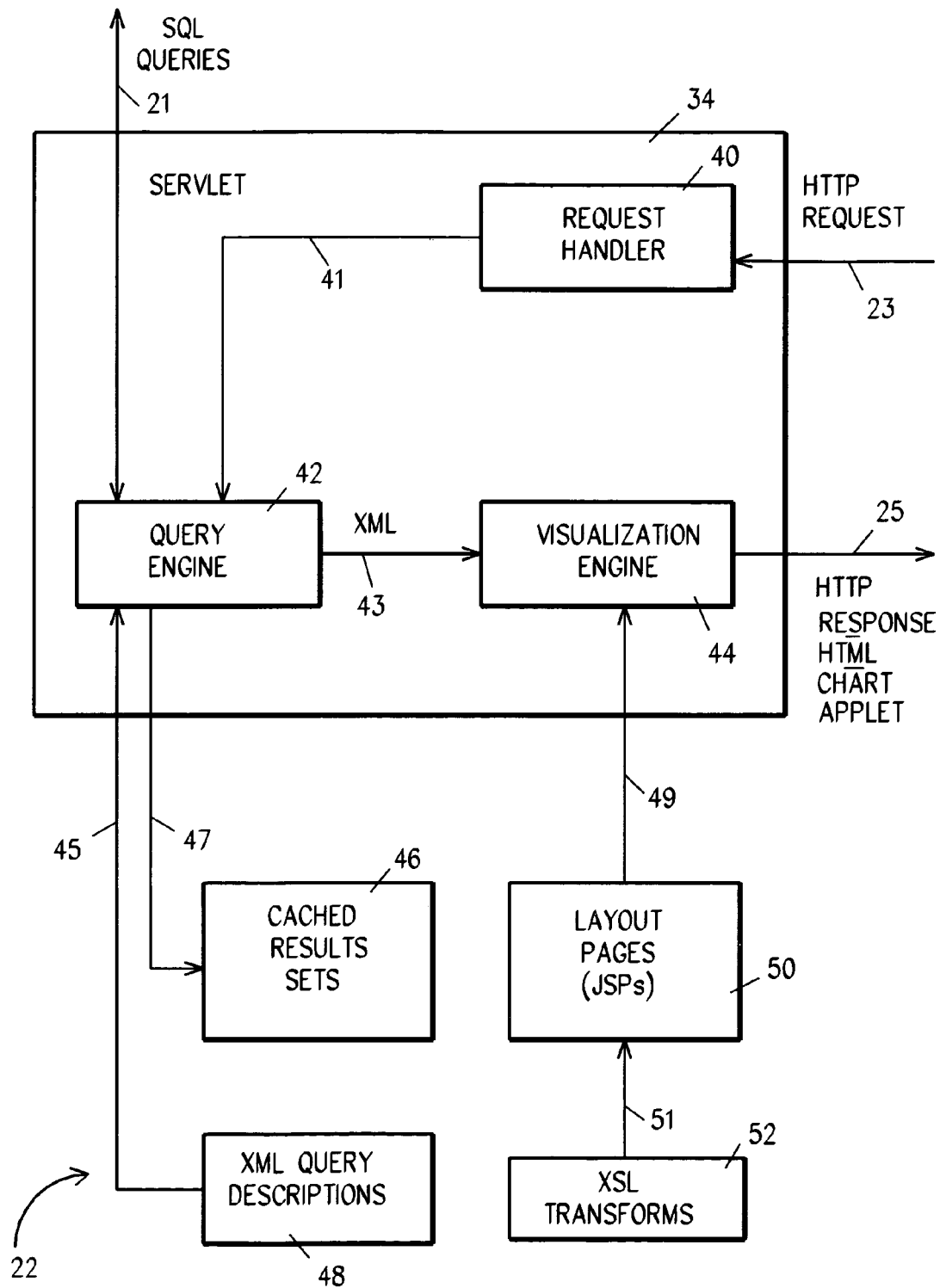
FIG. 3 is a system diagram further describing the web application server of FIG. 2.

Referring to FIG. 3, web application server 22 is further described. Servlet 34 includes request handler 40 for receiving HTTP requests on line 23, query engine 42 for generating SQL queries on line 21 to database server 20 and result set XML responses on line 43 to visualization engine 44. Visualization engine 44, selectively responsive to XML 43 and layout pages (JSPs) 50 on line 49, provides on line 25 HTTP responses, HTML, and chart applets back to client 24. Query engine 42 receives XML query descriptions 48 on line 45 and caches and accesses results sets 46 via line 47. Layout pages 50 reference XSL transforms 52 over line 51.

In accordance with the preferred embodiment of the invention, visualizations are constructed from data sources 32 that contain the metrics produced by a Lotus Discovery Server. The data source 32, which may be stored in an IBM DB2 database, is extracted through tightly coupled Java and XML processing.

Figure 4:
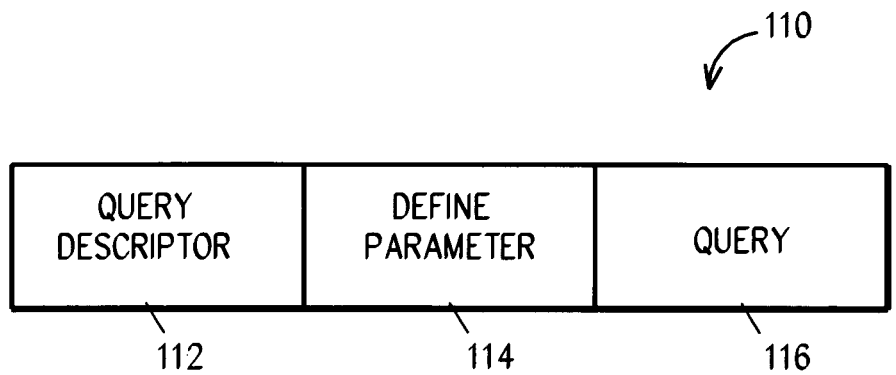
FIG. 4 is a diagrammatic representation of the XML format for wrapping SQL queries.

Referring to FIG. 4, the SQL queries 21 that are responsible for extraction and data-mining are wrapped in a result set XML format having a schema (or structure) 110 that provides three main tag elements defining how the SQL queries are executed. These tag elements are <queryDescriptor> 112, <defineParameter> 114, and <query> 116.

The <queryDescriptor> element 112 represents the root of the XML document and provides an alias attribute to describe the context of the query. This <queryDescriptor> element 112 is derived from http request 23 by request handler 40 and fed to query engine 42 as is represented by line 41.

The <defineParameter> element 114 defines the necessary parameters needed to construct dynamic SQL queries 21 to perform conditional logic on metrics database 32. The parameters are set through its attributes (localname, request- Parameter, and defaultValue). The actual parameter to be looked up is requestParameter. The localname represents the local alias that refers to the value of requestParameter. The defaultValue is the default parameter value.

QRML structure 116 includes <query> element 116 containing the query definition. There can be one or more <query> elements 116 depending on the need for multiple query executions. A <data> child node element is used to wrap the actual query through its corresponding child nodes. The three essential child nodes of <data> are <queryComponent>, <useParameter>, and <queryAsFullyQualified>. The <queryComponent> element wraps the main segment of the SQL query. The <useParameter> element allows parameters to be plugged into the query as described in <defineParameter>. The <queryAsFullyQualified> element is used in the case where the SQL query 21 needs to return an unfiltered set of data.

When a user at client browser 24 selects a metric to visualize, the name of an XML document is passed as a parameter in HTTP request 23 to servlet 34 as follows:

```
<input type=hidden name="queryAlias"
    value="AffinityPerCategory">
```

In some cases, there is a need to utilize another method for extracting data from the data source 32 through the use of a generator Java bean. The name of this generator bean is passed as a parameter in HTTP request 23 to servlet 34 as follows:

```
<input type=hidden
    name="queryAlias"value="PeopleInCommonByCommGenerator">
```

Once servlet 34 receives the XML document name or the appropriate generator bean reference at request handler 40, query engine 42 filters, processes, and executes query 21. Once query 21 is executed, data returned from metrics database 32 on line 21 is normalized by query engine 42 into an XML format 43 that can be intelligently processed by an XSL stylesheet 52 further on in the process.

Figure 5:
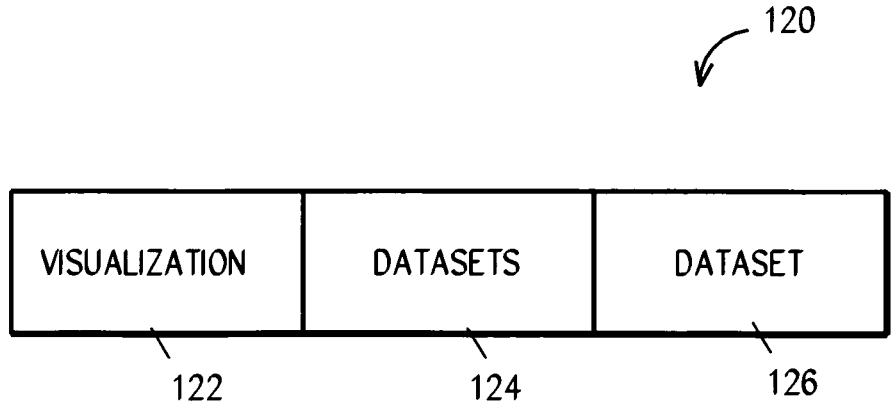
FIG. 5 is a diagrammatic representation of a normalized XML format, or QRML.

Referring to FIG. 5, the response back to web application server 22 placed on line 21 is classified as a Query Response Markup Language (QRML) 120. QRML 120 is composed of three main elements. They are <visualization> 122, <datasets> 124, and <dataset> 126. QRML structure 120 describes XML query descriptions 48 and the construction of a result set XML on line 43.

The <visualization> element 122 represents the root of the XML document 43 and provides an alias attribute to describe the tool used for visualization, such as a chart applet, for response 25.

The <datasets> element 124 wraps one or more <dataset> collections depending on whether multiple query executions are used.

The <dataset> element 126 is composed of a child node <member> that contains an attribute to index each row of returned data. To wrap the raw data itself, the <member> element has a child node <elem> to correspond to column data.

Data Translation and Visualization

Referring further to FIG. 3, for data translation and visualization, in accordance with the architecture of an exemplary embodiment of the invention, an effective delineation between the visual components (interface) and the data extraction layers (implementation) is provided by visualization engine 44 receiving notification from query engine 42 and commanding how the user interface response on line 25 should be constructed or appear. In order to glue the interface to the implementation, embedded JSP scripting logic 50 is used to generate the visualizations on the client side 25. This process is two-fold. Once servlet 34 extracts and normalizes the data source 32 into the appropriate XML structure 43, the resulting document node is then dispatched to the receiving JSP 50. Essentially, all of the data packaging is performed before it reaches the client side 25 for visualization. The page is selected by the value parameter of a user HTTP request, which is an identifier for the appropriate JSP file 50. Layout pages 50 receive the result set XML 120 on line 43, and once received an XSL transform takes effect that executes a transformation to produce parameters necessary to launch the visualization.

For a visualization to occur at client 24, a specific set of parameters needs to be passed to the chart applet provided by, for example, Visual Mining's Netcharts solution. XSL transformation 52 generates the necessary Chart Definition Language (CDLs) parameters, a format used to specify data parameters and chart properties. Other visualizations may involve only HTML (for example, as when a table of information is displayed).

An XSL stylesheet (or transform) 52 is used to translate the QRML document on line 43 into the specific CDL format shown above on line 25.

This process of data retrieval, binding, and translation all occur within a JSP page 50. An XSLTBean opens an XSL file 52 and applies it to the XML 43 that represents the results of the SQL query. (This XML is retrieved by calling queryResp.getDocumentElement ( )). The final result of executing this JSP 50 is that a HTML page 25 is sent to browser 24. This HTML page will include, if necessary, a tag that runs a charting applet (and provides that applet with the parameters and data it needs to display correctly). In simple cases, the HTML page includes only HTML tags (for example, as in the case where a simple table is displayed at browser 24). This use of XSL and XML within a JSP is a well-known Java development practice.

In pending U.S. patent application Ser. No. 10/286,211 filed 31 Oct. 2002 for "SYSTEM AND METHOD FOR DETERMINING FOUNDERS OF AN INFORMATION AGGREGATE", Table 1 illustrates an example of XML structure 110; Table 2 illustrates an example of the normalized XML, or QRML, structure; Table 3 illustrates an example of CDL defined parameters fed to client 24 on line 25 from visualization engine 44; Table 4 illustrates an example of how an XSL stylesheet 52 defines translation; and Table 5 is script illustrating how pre-packaged document node 43 is retrieved and how an XSL transformation 52 is called to generate the visualization parameters.

An exemplary embodiment of the system and method of the invention may be built using the Java programming language on the Jakarta Tomcat platform (v3.2.3) using the Model-View-Controller (MVC) (also known as Model 2) architecture to separate the data model from the view mechanism.

Social Networks

In accordance with the preferred embodiment of the invention, a social network is constructed based on analysis of shared virtual objects. In this context, a virtual object can be the electronic expression of a business process, a document, the on-line "presence" of a person, an electronic meeting, a collaborative application, a virtual classroom, a database, a Web site, and groups in a directory (such as LDAP or the Notes Name and Address book).

Figure 10:
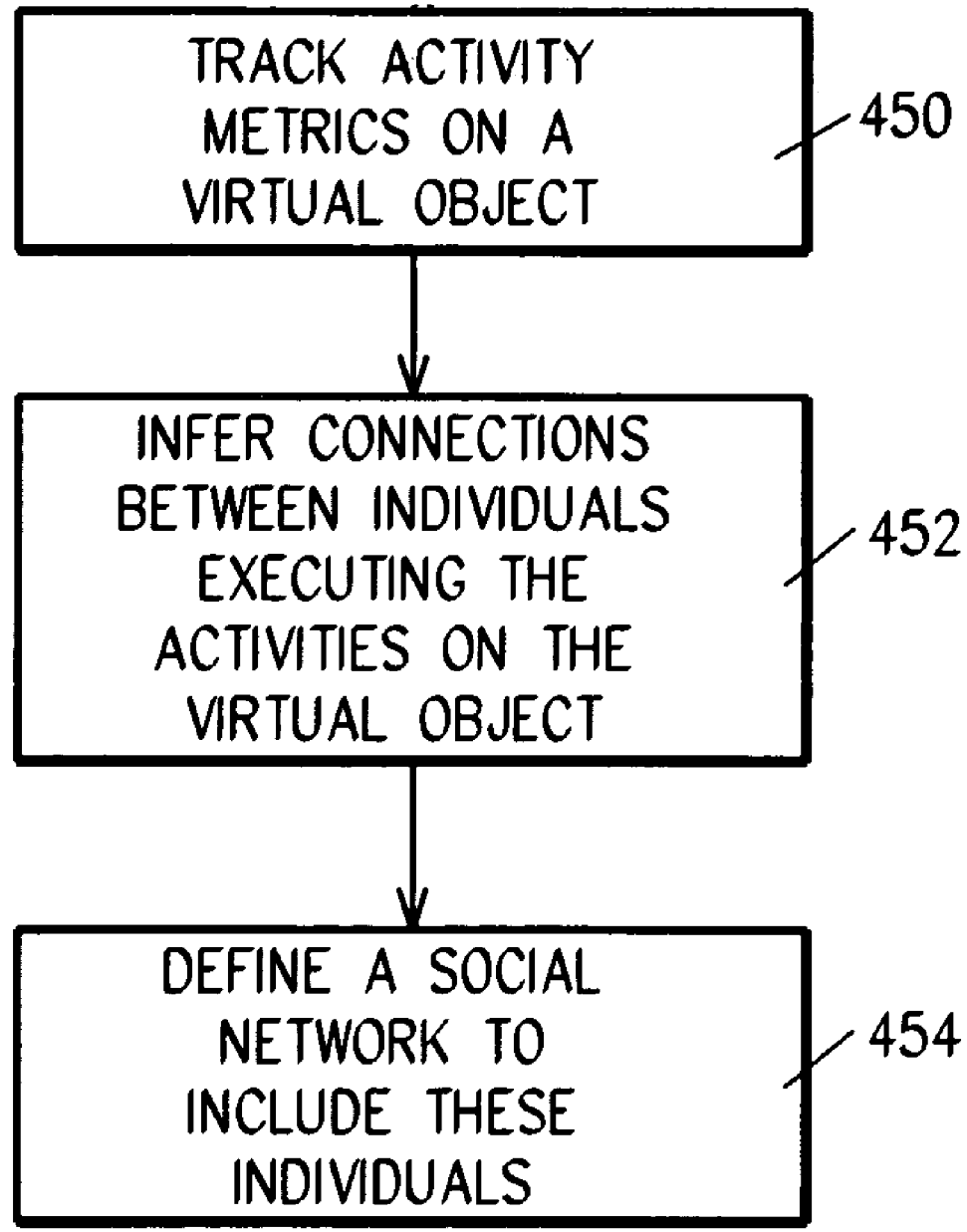
FIG. 10 is a flow chart representation of the preferred embodiment of the method of the invention.

Referring to FIG. 10, in step 450 activity metrics are tracked on a virtual object. For example, the Lotus Discovery Server tracks activity metrics for the documents that it organizes, so that when a document is created, modified, responded to, opened, or linked to is known. In step 452, these activity metrics are used to infer connections between individuals associated with the virtual object, such as by identifying the people who perform activities on a common document. In step 454, the social network is visualized to include these individuals. That a connection exists between any two people who operate on the same document may be inferred in building a social network.

The first way of deriving a social network is to use the activities that people perform on a virtual object. If two people act on the same virtual object, a connection can be inferred to exist between those people. For example, if A authors a document and B reads it, then that a connection exists between A and B can be inferred. B, at least, is aware of A and of what A wrote about. Another example would involve interaction with a business process such as the processing of purchase orders. If A submits a purchase order, and B approves it, a connection between A and B can be inferred.

The kinds of activities that can be used to infer connections vary with the type of virtual object. Table I shows some example activities for various virtual objects.

TABLE I

EXAMPLE ACTIVITIES FOR VIRTUAL OBJECTS

| Virtual object | Activity |
|---|---|
| Document | Check-out |
|  | Check-in |
|  | Change security |
|  | Open |
|  | Edit |
|  | Link to |
|  | Forward to |
|  | Respond to |
|  | Bookmark |
|  | Add to a persistent collection |
|  | Delete |
|  | Create |
|  | Review |
|  | Approve/Reject |
| Business process | Claim |
|  | Review |
|  | Approve/Reject |
|  | Delegate |
|  | Be delegated to |
|  | Submit request |
|  | View history |
|  | Change status |
|  | Other process-specific activities |
| Electronic meeting | Join |
|  | Leave |
|  | Raise hand |
|  | Make public comment |
|  | Make private comment |
|  | Share screen |
|  | Edit whiteboard |
| On-line presence | Invite to instant meeting |
|  | Share screen/application |
|  | Send e-mail |
|  | Chat |

These activities can be either directed or undirected. A directed activity uses the virtual object as a context in which to communicate with another person, such as directing a private message to another user during an electronic meeting. An undirected activity is concerned only with the virtual object (for example, a document edit). In either case, we can infer connections. For directed activities, the participants are clearly identified and so that a relationship exists between all participants can be inferred. For undirected activities, that a connection exists between all people who perform such activities on the same virtual object can be inferred.

The other way of deriving social network information is to analyze the meta-data of a virtual object for connections, where such meta-data identifies people. The particular kind of analysis would depend on the virtual object, but here are some examples:

1. Secured virtual objects will have an access control list that identifies the people who are able to perform different activities on the object. A document, for example, can list the people who can edit or read it.
2. A collaborative space (like a team room or a Quickplace) tracks the people who can read, edit, or manage the space. The access control list for such a space can be used to infer a connection between each pair of people listed.
3. Business processes identify people who are responsible for carrying out each step. That a connection exists between all people who are listed in the definition of the business process can be inferred.
4. Some electronic documents can list people who are responsible for reviewing or approving the document, or can identify people whose attention should be directed to the document (for example, team rooms). Such lists can then be used to infer connections between the pairs of people listed in the document.
5. Expertise location systems build profiles that identify the expertise of individuals. Expertise keywords can be considered a virtual object, and that a connection exists between two people who share an expertise or interest may be inferred.

All of these styles of connection can be given different weights, and a user interface to display the connections using the different weighting factors can be constructed. Such a user interface can include filtering mechanisms to filter out activities or virtual objects as necessary.

In accordance with a further exemplary embodiment of the invention, the people reported in the network may be filtered. One approach is to filter, or scope, by membership in a particular information aggregate (such as a community or a category), and report the social network within the context of (or generated from within) the aggregate.

Further in accordance with exemplary embodiments of the invention, a report on the actual connections detected is generated. This can be useful to explain the source of connections.

Information Aggregate

Figure 6:
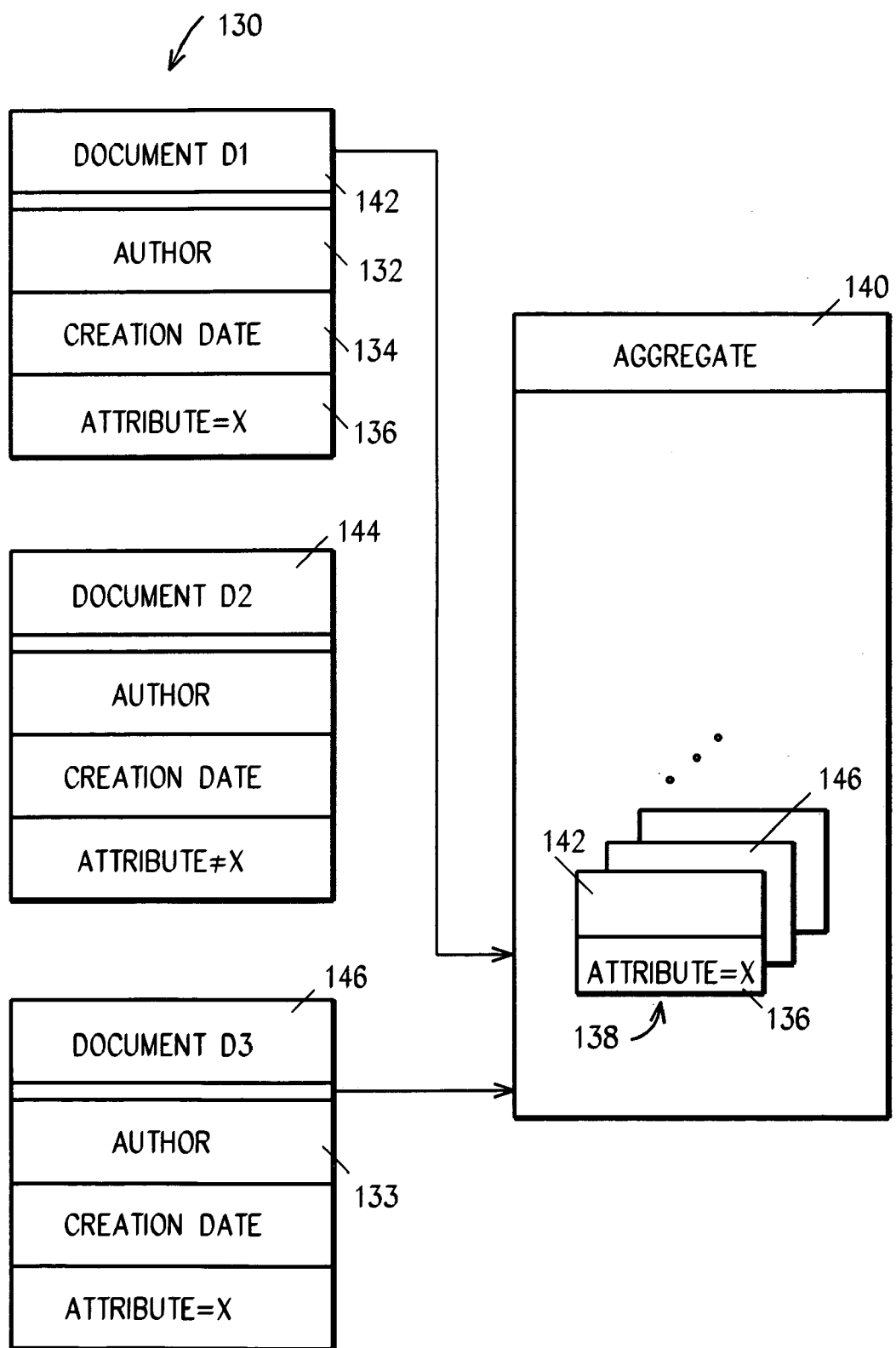
FIG. 6 is a diagrammatic representation of an aggregate in accordance with the preferred embodiment of the invention.

Referring to FIG. 6, a system in accordance with the present invention contains documents 130 such as Web pages, records in Notes databases, and e-mails. Each document 130 is associated with its author 132, and the date of its creation 134. A collection of selected documents 130 forms an aggregates 140. An aggregate 140 is a collection 138 of documents 142, 146 having a shared attribute 136 having non-unique values. Documents 138 can be aggregated by attributes 136 such as:

Category—a collection of documents 130 about a specific topic, a logical organization of knowledge resources based on similarities in content or focus, or due to the manner in which a group utilizes them.

Community—a collection of documents 130 of interest to a given group of people. This type of collection can be formed by identifying a set of knowledge repositories used by a community or team, and then forming the collection from the union of documents contained in the specified repositories. A community is a group of persons with a common interest, goal, or focus who communicate through some means over a period of time in an effort to further their individual and collective knowledge about that interest.

Location—a collection of documents 130 authored by people in a geographic location (e.g. USA, Utah, Massachusetts, Europe).

Job function or role—a collection of documents 130 authored by people in particular job roles (e.g. Marketing, Development).

Group (where group is a list of people)—a collection of documents authored by a given set of people.

Any other attributed 136 shared by a group (and having non-unique values).

Figure 7:
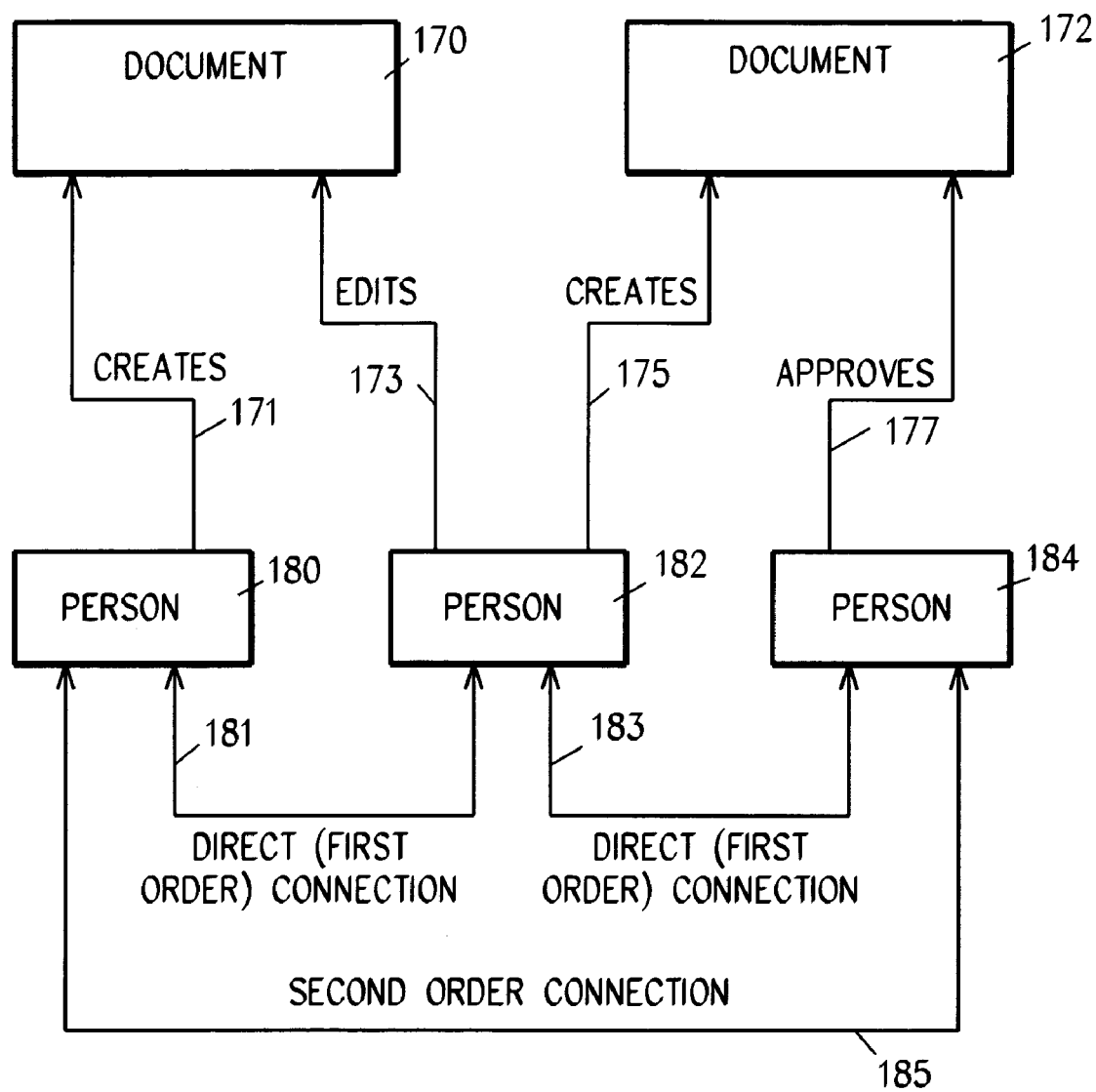
FIG. 7 is a diagrammatic illustration of first and second order connections.

Referring to FIG. 7, people may be associated with an aggregate in several ways. For example, person 180 is associated with document 170 as its creator and person 182 is associated with document 170 as an approver.

First and Second Degree Connections

FIG. 7 illustrates connections and associations. A social network is a group of people where each person has connections or interactions to other members of the group. By analyzing the metrics stored by LDS around shared knowledge resources 170, 172, the social network is reconstructed to include not only first degree connections and associations 181, 183, but also second degree associations 185. In an exemplary embodiment of the invention, the first and second degree associations are considered. A first degree association 181 is illustrated by person 180 creating 171 a document 170 which is edited 173 by person 182. This may be as simple as 'Alice 180 replied to Bob 180', so Bob 182 becomes a member of Alice's first degree social network 181, and likewise, Alice 180 becomes a member of Bob's first degree network 181. A second degree association 185 occurs when person 184, say Carol, is added to Alice's 180 social network because Carol is a member of Bob's network 183 who is, in turn, a member of Alice's network 181. Typically, being aware of these second degree associations 185, enables a person 180 to initially approach someone 184 who had needed knowledge (as is represented by document 172) with whom a formal introduction had not occurred. Understanding that person 184 is a part of a second degree network 185 and the path 171, 173, 175 177 provided by the association allows the person 180 to ask for an introduction to person 184 by someone (person 182) known to both. Often, this results in more cooperation.

Community Membership

Figure 8:
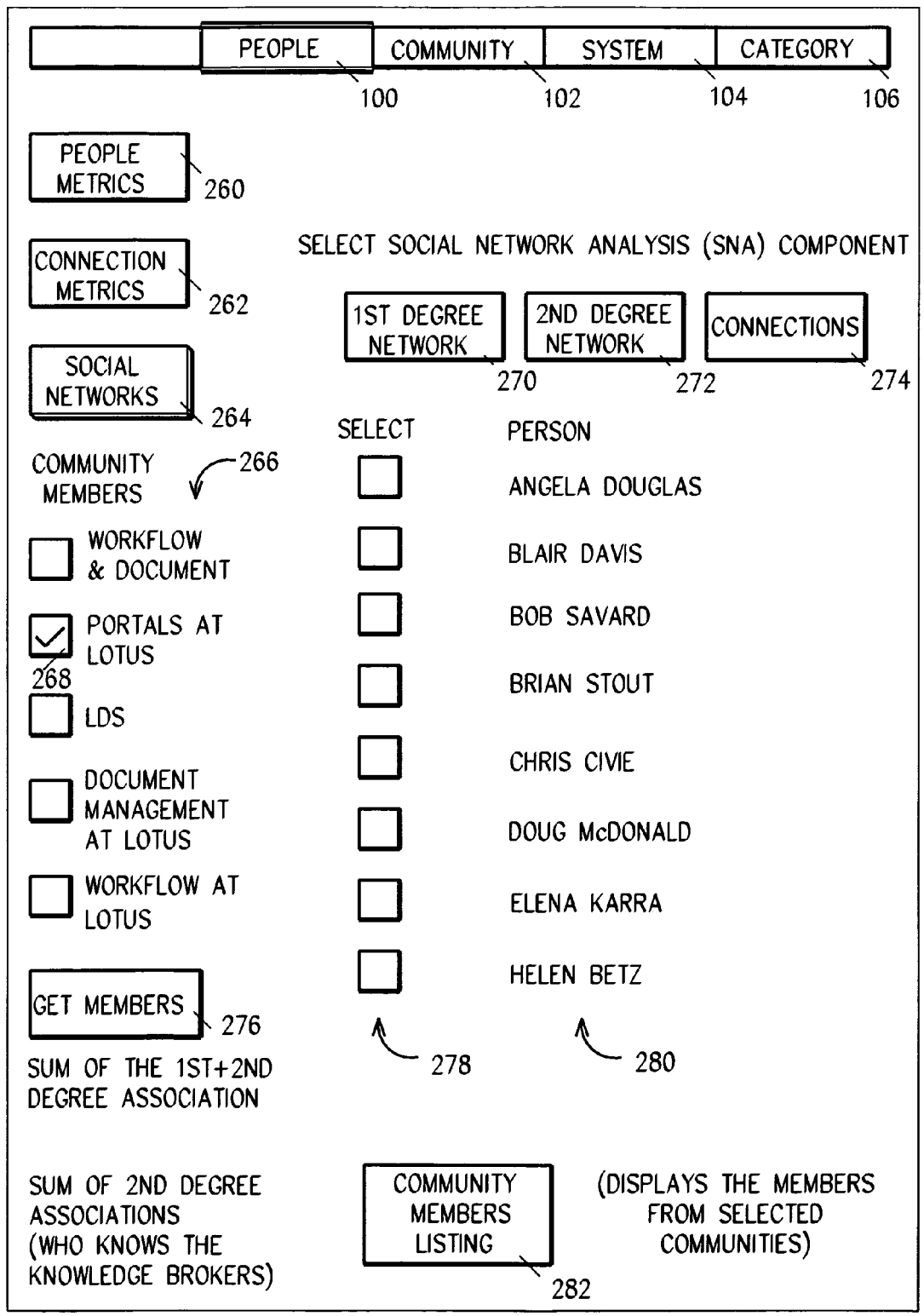
FIG. 8 is a diagrammatic illustration of a display of social networks according to an exemplary embodiment of the invention.
Figure 9:
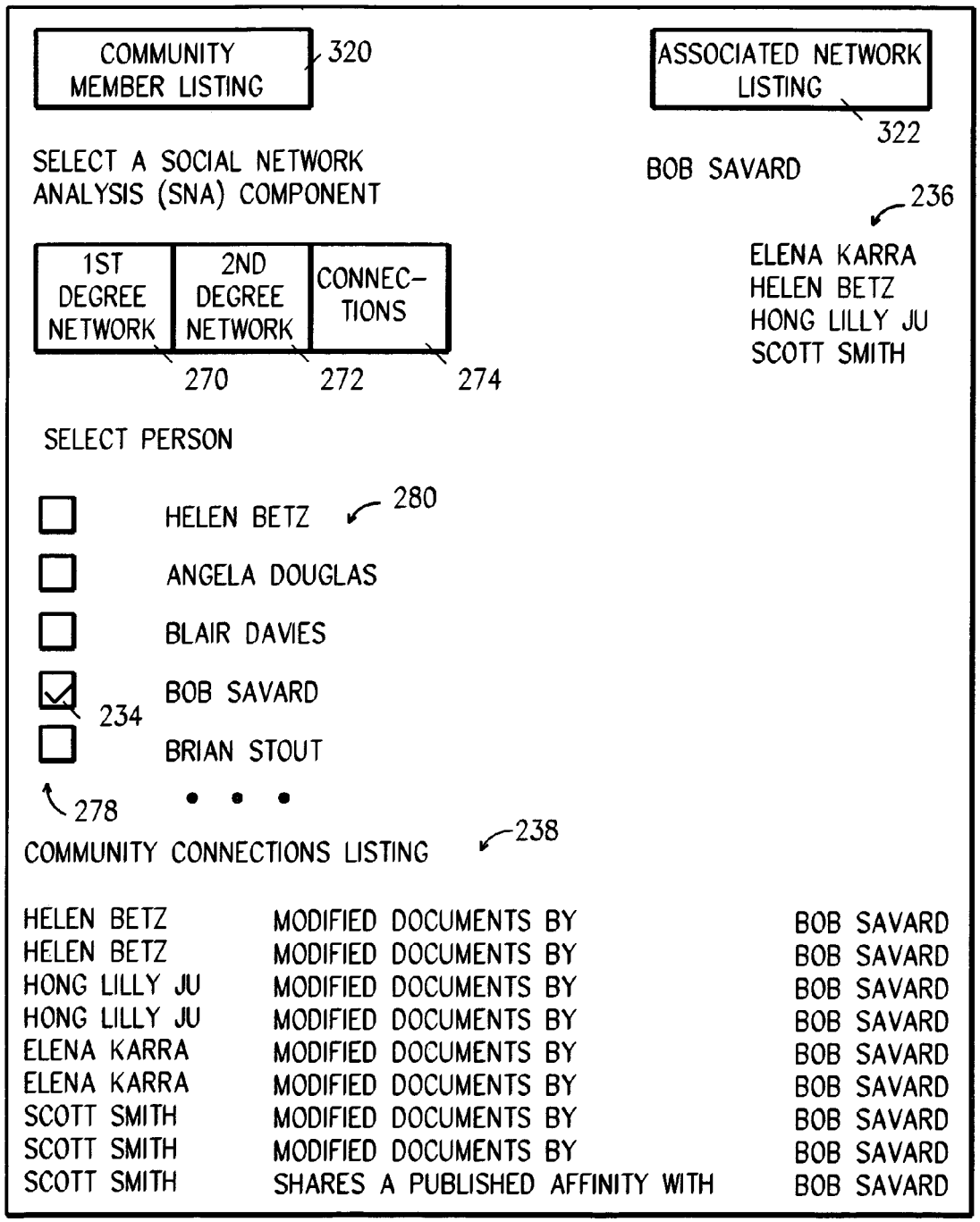
FIG. 9 is a diagrammatic illustration of a display of community connections according to an exemplary embodiment of the invention.

Referring to FIGS. 8 and 9, examples of a graphical user interfaces (GUI) at client browser 24 are illustrated for displaying membership of a community and social network connections. As in FIG. 1, a visualization portfolio is strategically partitioned into four distinct domains, or explorers: people 100, community 102, system 104, and category 106. In this case, people domain 100 is selected. Within people domain 100, a user may then select among people metrics 260, connection metrics 262, and social networks metrics 264. Referring to FIG. 8, in the case of this example, the user has selected social networks metrics 264 and has selected portals community 268 from among communities 266, and then selected get members 276. (The user may select one or more communities from list 266). By selecting community members listing 282, a list 280 of members appears in the window to the right, together with buttons 278 for selecting individuals for further identification and analysis of their activity with respect to the community.

The list of members 280 may be found by looking at all or selected document activity within a community. This example GUI may be further refined to analyze activity within a fixed time window by specifying start and end times for determining list 280 and viewing successive time periods in a plurality of window displays. It may further be refined to weight activity in order to filter out low contributors. Alternatively, community list 266 may be replaced with a category list, and membership metrics defined with respect to one or more categories selected from the category list.

The exemplary embodiment of the invention uses communities, but this idea may be extended to any type of information aggregate. The membership in any information aggregate is derived as in the community example, and then used as the basis for selecting the individuals for whom a social network is to be displayed.

Referring to FIG. 9, with Bob Savard 234 and first degree network 270 selected, listing 236 shows the people associated directly with Bob Savard. By selecting second degree network 272, listing 236 would be modified to display those individuals sharing a second degree associations with Bob Savard. With connections 274 selected, community connections listing 238 displays specific interactions with shared documents.

In accordance with a further embodiment of the invention, a social network may be determined and displayed at periodic times, thus enabling visualization of the social network as it evolves over time.

Thus, in accordance with the various embodiments of the present invention, social networks may be visualized using workflow-related information (such as a list of document reviewers), using business processes, using analysis of activity around documents managed in a document-management system, such as check-in and check-out; using shared affinity or expertise profile as a virtual object; using access control lists as a source of network data; using information aggregates to filter the view of people displayed; using groups in a directory as a source of connection data; and visualizing a connection report showing the detailed connections between people.

Advantages over the Prior Art

It is an advantage of the invention that there is provided an improved system and method for building a social network.

It is a further advantage of the invention that there is provided a system and method for building a social network based upon a broad set of activity metrics and various types of virtual objects.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A computer implemented method for building a social network for systematically leveraging information and expertise to improve organizational responsiveness, innovation, competency, and efficiency, comprising:
   selecting an electronic meeting or online presence;
   tracking directed and undirected activities by each of a plurality of individuals to said electronic meeting or online presence;
   inferring individual first order and second order connections to said electronic meeting or online presence by said individuals from said directed and undirected activities; a first order connection inferred between first and second individuals each having a direct activity with respect to said electronic meeting or online presence; a second order connection inferred between said first individual and a third individual, with said third individual sharing a first order connection to a second electronic meeting or online presence with said second individual;
   defining said social network to include said first, second and third individuals sharing said connections to said electronic meeting or online presence; and
   at least momentarily fixing for recording and reporting purposes at a user interface a visual representation of said social network;
   said visual representation being presented by:
      providing to a user interface of a computer apparatus user selectable buttons for selecting at least one designated community and one metric type from a set of metric types including connection metric, people metric, and social networks metric;
      with said social networks metric selected, providing at said user interface user selectable buttons for selecting first degree network, second degree network, and connections analysis components;
      responsive to user selection of said social networks metric and said first degree network analysis component, presenting at said user interface a display of said first and second individuals sharing first order connections to said designated community;
      responsive to user selection of said social networks metric and said second degree network analysis component, presenting at said user interface a display of said first, second, and third individuals sharing first order and second order connections to said designated community; and
      responsive to user selection of said connections analysis component, presenting at said user interface a community connections listing.

2. The method of claim 1, said inferring including identifying connections to said electronic meeting or online presence by individuals who join, leave, raise hand, make public comment, make private comment, share screen or edit whiteboard with respect to an electronic meeting.

3. The method of claim 1, said inferring including identifying connections to said electronic meeting or online presence by individuals who invite to instant meeting, share screen, share application, send e-mail, or chat with respect to an online presence.

4. The method of claim 1, further comprising:
   periodically refreshing said inferring and responsive thereto visualizing said social network as it evolves over time.

5. The method of claim 1, further comprising:
   visualizing said social network including said individuals and said activities connecting said individuals.

6. A computer system for building a social network for systematically leveraging information and expertise to improve organizational responsiveness, innovation, competency, and efficiency, comprising:
   means for selecting an electronic meeting or online presence; p1 means for tracking directed and undirected activities by a plurality of individuals on said electronic meeting or online presence;
   means for inferring from said undirected activities individual first order and second order connections to said electronic meeting or online presence by said individuals a first order connection existing between first and second individuals each having a direct activity with respect to said electronic meeting or online presence; a second order connection existing between said first individual and a third individual, with said third individual sharing a first order connection to a second electronic meeting or online presence with said second individual;
   means for defining said social network to include said first, second and third individuals sharing said connections to said electronic meeting or online presence;
   means for fixing at least momentarily for recording and reporting purposes at a user interface a visual representation of said social network;
   said means for fixing presenting said visual representation by:
      providing to a user interface of a computer apparatus user selectable buttons for selecting at least one designated community and one metric type from a set of metric types including connection metric, people metric, and social networks metric;
      with said social networks metric selected, providing at said user interface user selectable buttons for selecting first degree network, second degree network, and connections analysis components;
      responsive to user selection of said social networks metric and said first degree network analysis component, presenting at said user interface a display of said first and second individuals sharing first order connections to said designated community;
      responsive to user selection of said social networks metric and said second degree network analysis component, presenting at said user interface a display of said first, second, and third individuals sharing first order and second order connections to said designated community; and
      responsive to user selection of said connections analysis component, presenting at said user interface a community connections listing.

7. A computer system for determining a social network for systematically leveraging information and expertise to improve organizational responsiveness, innovation, competency, and efficiency, comprising:

a metrics database for storing electronic meeting or online presence indicia including document attributes, directed and undirected activities, and persons associated with said directed and undirected activities;

a query engine responsive to a user request and said metrics database for inferring individual first order and second order connections to said electronic meeting or online presence by individuals executing said directed and undirected activities, a first order connection existing between first and second individuals each having a direct activity with respect to said electronic meeting or online presence, and a second order connection existing between said first individual and a third individual, with said third individual sharing a first order connection to a second electronic meeting or online presence with said second individual;

a visualization engine for at least momentarily fixing for recording and reporting purposes at a user interface a visual representation of said social network for visualizing membership in a social network as including said first, second and third individuals said visualization engine visualizing said membership by:

providing to a user interface of a computer apparatus user selectable buttons for selecting at least one designated community and one metric type from a set of metric types including connection metric, people metric, and social networks metric;

with said social networks metric selected, providing at said user interface user selectable buttons for selecting first degree network, second degree network, and connections analysis components;

responsive to user selection of said social networks metric and said first degree network analysis component, presenting at said user interface a display of said first and second individuals sharing first order connections to said designated community;

responsive to user selection of said social networks metric and said second degree network analysis component, presenting at said user interface a display of said first, second, and third individuals sharing first order and second order connections to said designated community; and responsive to user selection of said connections analysis component, presenting at said user interface a community connections listing.

8. The system of claim 7, further comprising:

said query engine further for collecting a plurality of documents having non-unique values on a first shared attribute into a collection;

said visualization engine further for filtering said social network to include only individuals having membership in said collection.

9. A program storage device readable by a machine, tangibly embodying a program of instructions executable by a machine to perform method steps for defining a social network for systematically leveraging information and expertise to improve organizational responsiveness, innovation, competency, and efficiency, said method comprising:

storing electronic meeting or online presence indicia including document attributes, directed and undirected activities with respect to said document, and persons associated with said directed and undirected activities in a metrics database;

responsive to a user request and said metrics database, inferring individual first order and second order connections to said electronic meeting or online presence indicia by individuals executing said directed and undirected activities, a first order connection existing between first and second individuals each having a direct activity with respect to said electronic meeting or online presence, and a second order connection existing between said first individual and a third individual, with said third individual sharing a first order connection to a second electronic meeting or online presence with said second individual;

at least momentarily fixing for recording and reporting purposes at a user interface a visual representation of said social network for visualizing membership as including said first, second and third individuals;

said visual representation being presented by:

providing to a user interface of a computer apparatus user selectable buttons for selecting at least one designated community and one metric type from a set of metric types including connection metric, people metric, and social networks metric;

with said social networks metric selected, providing at said user interface user selectable buttons for selecting first degree network, second degree network, and connections analysis component;

responsive to user selection of said social networks metric and said first degree network analysis component, presenting at said user interface a display of said first and second individuals sharing first order connections to said designated community;

responsive to user selection of said social networks metric and said second degree network analysis component, presenting at said user interface a display of said first, second, and third individuals sharing first order and second order connections to said designated community; and responsive to user selection of said connections analysis component, presenting at said user interface a community connections listing.

10. The program storage device of claim 9, said method further comprising collecting a plurality of documents having non-unique values on a first shared attribute into a collection; and filtering said social network to include only individuals having membership in said collection.

11. A program storage device readable by a machine, tangibly embodying a program of instructions executable by a machine to perform method steps for defining a social network for systematically leveraging information and expertise to improve organizational responsiveness, innovation, competency, and efficiency, said method comprising:

selecting an electronic meeting or online presence;

tracking directed and undirected activities by each of a plurality of individuals on said electronic meeting or online presence;

inferring individual first order and second order connections to said electronic meeting or online presence by said individuals from said directed and undirected activities, a first order connection existing between first and second individuals each having a direct activity with respect to said electronic meeting or online presence, and a second order connection existing between said first individual and a third individual, with said third individual sharing a first order connection to a second electronic meeting or online presence with said second individual;

defining said social network to include said first, second and third individuals inferred as having said connections to said electronic meeting or online presence;

at least momentarily fixing for recording and reporting purposes at a user interface a visual representation of said social network;

said visual representation being presented by:
provicing to a user interface of a computer apparatus user selectable buttons for selecting at least one designated community and one metric type from a set of metric types including connection metric, people metric, and social networks metric;

with said social networks metric selected, providing at said user interface user selectable buttons for selecting first degree network, second degree network, and connections analysis components;

responsive to user selection of said social networks metric and said first degree network analysis component, presenting at said user interface a display of said first and second individuals sharing first order connections to said designated community;

responsive to user selection of said social networks metric and said second degree network analysis component, presenting at said user interface a display of said first, second, and third individuals sharing first order and second order connections to said designated community; and responsive to user selection of said connections analysis component, presenting at said user interface a community connections listing.

12. A computer program product for defining a social network for systematically leveraging information and expertise to improve organizational responsiveness, innovation, competency, and efficiency, according to the method comprising:

selecting an electronic meeting or online presence;

tracking directed and undirected activities by a plurality of individuals on said electronic meeting or online presence;

inferring individual first order and second order connections to said electronic meeting or online presence by said individuals from said directed and undirected activities, a first order connection existing between first and second individuals each having a directed activity with respect to said electronic meeting or online presence, and a second order connection existing between said first individual and a third individual, with said third individual sharing a first order connection to a second electronic meeting or online presence with said second individual;

defining said social network to include said first, second and third individuals inferred as having said connections to said electronic meeting or online presence;

at least momentarily fixing for recording and reporting purposes at a user interface a visual representation of said social network;

said visual representation being presented by:
providing to a user interface of a computer apparatus user selectable buttons for selecting at least one designated community and one metric type from a set of metric types including connection metric, people metric, and social networks metric;

with said social networks metric selected, providing at said user interface user selectable buttons for selecting first degree network, second degree network, and connections analysis components;

responsive to user selection of said social networks metric and said first degree network analysis component, presenting at said user interface a display of said first and second individuals sharing first order connections to said designated community;

responsive to user selection of said social networks metric and said second degree network analysis component, presenting at said user interface a display of said first, second, and third individuals sharing first order and second order connections to said designated community;

responsive to user selection of said connections analysis component, presenting at said user interface a community connections listing.

* * * * *